(12) United States Patent
Bruhn et al.

(10) Patent No.: US 12,550,825 B2
(45) Date of Patent: Feb. 17, 2026

(54) COLLECTING APPARATUS FOR ROUND BALES

(71) Applicant: Maschinenfabrik Bernard Krone GmbH & Co. KG, Spelle (DE)

(72) Inventors: Nils Bruhn, Spelle (DE); Christian Osthues, Horstel (DE); Dirk Blome, Löningen (DE); André Berghaus, Billerbeck (DE); Michael Kreyenhagen, Böhmte (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 0 days.

(21) Appl. No.: 18/444,171

(22) Filed: Feb. 16, 2024

(65) Prior Publication Data

US 2024/0276921 A1 Aug. 22, 2024

(30) Foreign Application Priority Data

Feb. 17, 2023 (DE) .......................... 102023103974.1

(51) Int. Cl.
*A01D 90/08* (2006.01)
(52) U.S. Cl.
CPC .................................. *A01D 90/083* (2013.01)
(58) Field of Classification Search
CPC ...... A01D 90/08; A01D 90/10; A01D 90/083; A01D 87/127; A01D 2087/128; A01D 87/122; B60P 1/36; B60P 1/38; B60P 1/4407; B60P 1/00; B60P 1/4414; B60P 1/4471; B60P 1/48; B65G 1/127; B65G 1/12; B65G 15/20; B65G 15/14; B65G 15/12; B65G 15/28; B65G 17/04; B65G 35/02; B65G 35/06; A01F 15/071; A61G 3/062
USPC .................. 100/188 R; 198/690.2, 715, 717; 414/24.5, 24.6, 111, 502
See application file for complete search history.

(56) References Cited

U.S. PATENT DOCUMENTS 2,613,591 A 10/1952 Bruns et al.
2,643,604 A 6/1953 Hansen
(Continued)

OTHER PUBLICATIONS

Extended European Search Report in EP24153329.8, mailed Jul. 2, 2024, 10 pages.

*Primary Examiner* — Gregory W Adams
(74) *Attorney, Agent, or Firm* — McKee, Voorhees & Sease, PLC

(57) ABSTRACT

The present invention relates to a collecting apparatus for round bales. The collecting apparatus has a frame device and a conveying device, which is designed to convey a plurality of round bales relative to the frame device in a conveying direction. The conveying device comprises at least two traction members, which are spaced apart from one another transversely to the conveying direction and are designed to rotate about a front deflection axis and a rear deflection axis and have a conveying run and a return run. The conveying device also comprises at least two conveying elements, which are arranged offset to one another in the conveying direction, extend longitudinally between the conveying runs of the traction members transversely to the conveying direction, are attached to the traction members, and in each case have a conveying section arranged centrally between the traction members.

15 Claims, 4 Drawing Sheets

(56) References Cited

U.S. PATENT DOCUMENTS

| | | | | |
|---|---|---|---|---|
| 3,218,667 A | * | 11/1965 | Schmidt, Jr. | A22B 5/04 |
| | | | | 452/183 |
| 3,610,398 A | * | 10/1971 | Rice | B67C 3/30 |
| | | | | 198/395 |
| 3,985,253 A | * | 10/1976 | Kannady | B60P 1/08 |
| | | | | 414/24.5 |
| 4,044,906 A | * | 8/1977 | Schrag | A01D 90/083 |
| | | | | 414/491 |
| 5,639,199 A | * | 6/1997 | Connell, Jr. | A01D 90/083 |
| | | | | 414/24.5 |
| 7,004,706 B1 | | 2/2006 | Wilson | |
| 7,954,631 B1 | * | 6/2011 | Weaver | B65G 19/24 |
| | | | | 198/729 |
| 9,066,471 B1 | * | 6/2015 | Monahan | A01D 90/083 |
| 10,106,316 B2 | * | 10/2018 | Munholland | B65G 65/00 |
| 10,321,632 B2 | * | 6/2019 | Jones | A01D 90/083 |
| 10,717,602 B2 | * | 7/2020 | Pavan | B65G 17/36 |
| 2023/0052922 A1 | * | 2/2023 | Thibault | B65G 19/24 |

* cited by examiner

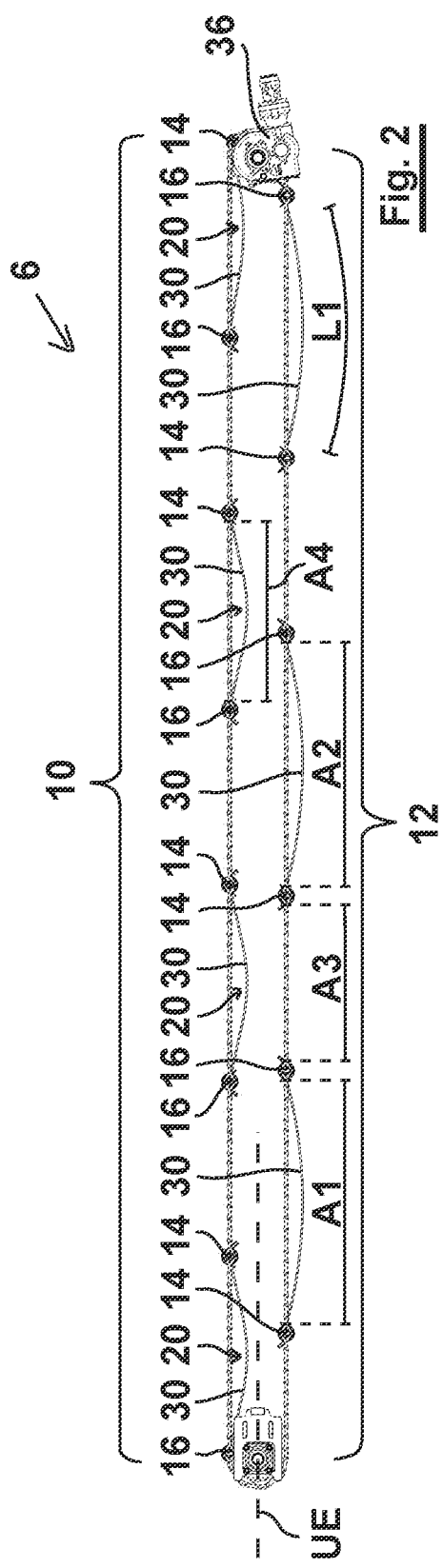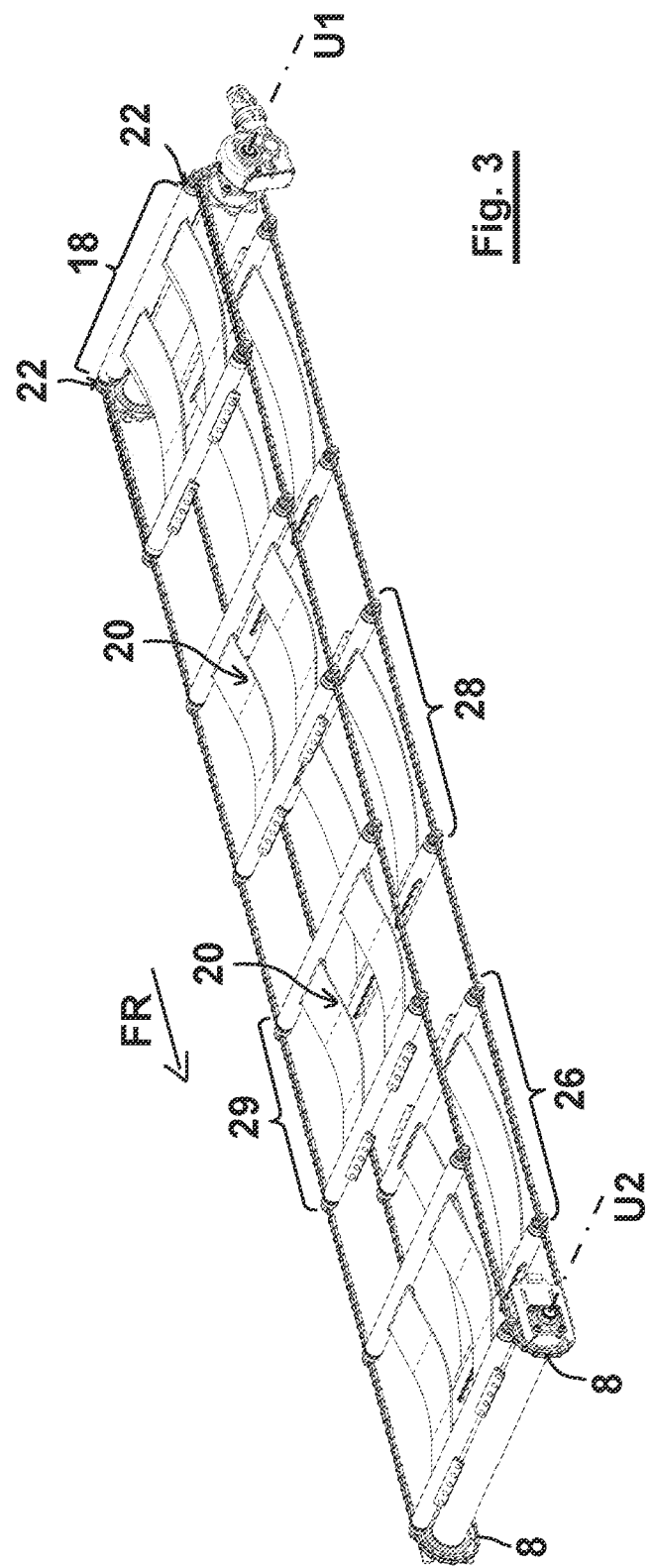

COLLECTING APPARATUS FOR ROUND BALES

CROSS REFERENCE TO RELATED APPLICATIONS

This application claims priority under 35 U.S.C. § 119 to German Patent Application DE 10 2023 103974.1, filed Feb. 17, 2023, which is herein incorporated by reference in its entirety, including without limitation, the specification, claims, and abstract, as well as any figures, tables, appendices, or drawings thereof.

TECHNICAL FIELD

The present disclosure relates generally to a collecting apparatus for round bales.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Such a collecting apparatus is known from the document U.S. Pat. No. 9,066,471 B1. The collecting apparatus disclosed is used to collect round bales deposited on arable land. According to the prior art, the conveying device is designed in the form of a scraper floor. The conveying elements rest with their conveying sections on a flat surface of the frame device. Round bales conveyed by the conveying device are pushed by one of the conveying elements in the conveying direction and roll on the surface of the frame device.

A disadvantage of the prior art is that the usual wrapping material of the round bales regularly unrolls during the conveying operation, which weakens or breaks up the round bales. Another disadvantage is that the round bales roll over the conveying elements when the collecting apparatus is operated even on slightly inclined arable land and clings to adjacent round bales. The friction of the adjacent round bales against each other further promotes the weakening or disintegration of the round bales. Furthermore, controlled conveying and controlled unloading of the round bales by the conveying device on the inclined arable land is not possible.

Thus, there exists a need in the art for a generic collecting apparatus that enables the round bales to be conveyed reliably and gently.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

The present invention relates to a collecting apparatus for round bales. The collecting apparatus has a frame device and a conveying device. The conveying device is designed to convey a plurality of round bales relative to the frame device in a conveying direction. The conveying device has at least two traction members and at least two conveying elements arranged offset to one another in the conveying direction. The traction members are spaced apart from one another transversely to the conveying direction and are designed to rotate about a front deflection axis and a rear deflection axis. The traction members have a conveying run and a return run. At least in one conveying configuration of the conveying device, the conveying elements extend longitudinally between the conveying runs of the traction members transversely to the conveying direction. The conveying elements are attached to the traction members and in each case, have a conveying section arranged centrally between the traction members.

An aspect of the present invention includes a collecting apparatus (2) for round bales, having a frame device (4) and a conveying device (6) which is designed to convey a plurality of round bales relative to the frame device (4) in a conveying direction (FR) and has at least two traction members (8) which are spaced apart from one another transversely to the conveying direction (FR), are designed to rotate about a front deflection axis (U1) and a rear deflection axis (U2) and have a conveying run (10) and a return run (12), and has at least two conveying elements (14, 16) which are arranged offset relative to one another in the conveying direction (FR) and which at least in one conveying configuration of the conveying device (6) extend longitudinally between the conveying runs (10) of the traction members (8) transversely to the conveying direction (FR), are attached to the traction members (8) and in each case have a conveying section (18) arranged centrally between the traction members (8), wherein the conveying sections (18) in the conveying configuration are spaced apart from the frame device (4) by a conveying distance (FA) in order to form a receiving space (20) extending between them for receiving a round bale to be conveyed.

According to the invention, the conveying sections of the conveying elements in the conveying configuration are spaced apart from the frame device by a conveying distance in order to form a receiving space extending between the conveying sections for receiving a round bale to be conveyed.

The collecting apparatus is used to receive and transport a plurality of round bales. For this purpose, the round bales are to be lined up on the collecting apparatus in the conveying direction. In this case, the axis of rotation or symmetry of the round bales runs in particular parallel to the deflection axes.

The frame device of the collecting apparatus comprises, in particular, all components of the collecting apparatus that are not included in the conveying device, i.e., that do not move with the conveying device in the conveying direction during operation. Preferably, the frame device comprises a machine frame of the collecting apparatus as well as components, such as housing elements, a running gear, or the like, which are arranged immovably on it, at least during normal operation.

The conveying device conveys, in particular, after a round bale has been received by the collecting apparatus and before the next round bale is received. Conveying frees up the space on the collecting apparatus where new round bales to be received are initially placed. The conveying direction is preferably opposite to the direction of travel of the collecting apparatus. During each conveying operation, the conveying device is moved in particular by a distance in the conveying direction that is slightly larger than the diameter of the round bales received. After all the spaces available for round bales on the collecting apparatus have been filled with round bales, they are deposited by the collecting apparatus by being further conveyed by the conveying device in the conveying direction.

The traction members of the conveying device are preferably chains, in particular roller chains, or belts. The traction members preferably rotate about deflection elements such as toothed wheels in the area of the deflection axes. At least one of the toothed wheels, in particular the two toothed wheels rotating about the front deflection axis, is/are preferably driven, in particular by a hydraulic motor of the collecting apparatus. The traction members are preferably spaced apart by more than 120 cm, particularly preferably by at least substantially 130 cm, transversely to the conveying direction. The traction members are preferably at least partially enclosed in a U-shape by the frame device. The conveying runs, and return runs are essentially straight sections of the traction members. During operation, the conveying runs are, in particular, the runs that are closer to the conveyed round bales and move in the conveying direction, whereas the return runs move in the opposite direction to the conveying direction.

The conveying elements are preferably rods or profiles that extend longitudinally at right angles to the conveying direction from one traction member to the other. At least in a plan view, the conveying elements are arranged between the traction members. In particular, conveying elements are distributed over the entire length of the traction members. During operation, the conveying elements are moved in the conveying direction by the traction members and, in turn, act on the round bales.

Each conveying element has a conveying section. In particular, the conveying section is the section of each conveying element that is covered in the plan view by the round bale conveyed directly or indirectly by the conveying element. In particular, the conveying section is a part of the conveying element and is located between two imaginary planes that extend at right angles to the deflection axes. In particular, the conveying section has a width of 120 cm measured transversely to the conveying direction. During operation, the round bale is in direct contact with the conveying section in particular at least some of the time. The conveying section is spaced in particular equally far apart from both traction members and is particularly preferably intersected in the center by a longitudinal center plane which is equidistant from both traction members and extends at right angles to the axes of rotation.

The receiving space is a free space, which can receive a round bale. The receiving space extends inter alia between the two conveying elements. Due to the spacing of the conveying sections from the frame device, the receiving space preferably extends vertically between the conveying sections in that, in a side view, the receiving space extends partly above and partly below the intermediate space between the two conveying sections. The receiving space preferably extends closer to a deflection axis plane, in which the deflection axes are arranged, than the conveying sections of the conveying elements or is even intersected by the deflection axis plane. In this case, the receiving space between the conveying elements does not have to be objectively delimited, but can be defined by a purely imaginary enveloping surface. In particular, the conveying sections are spaced apart from the frame device in such a way that the entire weight of the round bales rests on the conveying elements during operation. The collecting apparatus preferably forms at least three receiving spaces.

The round bales to be conveyed sink partially between the conveying elements through the receiving spaces formed according to the invention. This prevents unintentional movement of the round bale relative to the conveying elements. In this way, a distance between adjacent round bales can also be reliably maintained. The spacing of the receiving space from the frame device also prevents the round bale from unrolling during the conveying operation. Overall, this makes it possible to collect and deposit the round bales regardless of an inclination of the respective arable land and while protecting the round bales themselves.

Preferably, the collecting apparatus is designed to adapt the speed of the conveying operation to a traveling speed of the entire collecting apparatus against the conveying direction. This ensures that the round bales only move in a vertical direction when they are deposited on the arable land. In particular, it is possible to prevent the bales from moving partially in the conveying direction or in the opposite direction and rolling away from the intended deposit location when they hit the arable land. The collecting apparatus preferably has its own running gear with at least one axle and two wheels, which in a side view are arranged in particular at least essentially in the center and on which a traveling speed sensor is preferably arranged. In order to achieve the lowest possible center of gravity of the collecting apparatus, the wheels are preferably intersected by the deflection axis plane. At the front, the collecting apparatus preferably has a drawbar which is designed centrally in particular mirror-symmetrically to the longitudinal center plane and by means of which the collecting apparatus can be attached to a tractor or directly to a round baler. Preferably, the collecting apparatus has a transfer device at the front for transporting round bales into the receiving space, which can be pivoted about a pivot axis parallel to the deflection axes. In particular, the frame device has guide elements, which are arranged laterally above the conveying device in a cross-section at right angles to the conveying direction and are used to laterally support the round bales that are received.

Preferably, the frame device is designed in such a way that the conveying sections remain continuously spaced apart from the frame device by the conveying distance during operation during the movement of the conveying elements that comprise them in the conveying direction. The movement refers, in particular, to a movement directed essentially or strictly exclusively in the conveying direction. As a result, the reliable positioning of the round bale in the receiving space is maintained during the entire conveying operation along the conveying runs.

Particularly preferably, the conveying sections are spaced apart from the frame device in a longitudinal section at least as far as they are spaced apart from the deflection axis plane. In particular, this means that an intermediate space between the deflection axis plane and a conveying run plane in which the conveying runs extend is free of the frame device in a longitudinal section or in a side view between the deflection axes. In this case, the spacing is to be understood in particular as measured exclusively parallel to the longitudinal center plane. This design allows the round bales to sink so deeply between the conveying elements supporting them that the round bales are positioned particularly reliably.

At least one of the conveying elements has a roller mounted so that it can rotate relative to the conveying section of the conveying element. The roller rests so as to roll on a rolling surface of the frame device, at least when the conveying element is arranged on the conveying runs. The roller allows the weight force transferred from the round bale to the conveying element to be transferred directly to the frame device without significant friction occurring between the conveying device and the frame device during the conveying operation. By minimizing friction, wear leading to failure of the conveying device can be minimized, and vibrations that endanger the strength of the round bale during the conveying operation can be largely avoided.

The roller is advantageously arranged between the conveying section of the conveying element and at least one of the traction members. In this way, the weight force can be introduced into the frame device directly adjacent to the receiving space, and it is possible to avoid unnecessary stress and, thus, any risk to the functionality of the conveying device. Alternatively, the traction member could also extend between the roller and the conveying section. Preferably, the conveying element has two rollers between which the conveying section is arranged.

Preferably, the conveying section is round in the cross-section of the conveying element comprising it, i.e., in the longitudinal section of the collecting apparatus. The diameter of the conveying section is particularly preferably at least substantially the same as the diameter of the at least one roller. As an alternative to the at least one roller, the weight of the round bales can also be absorbed by the traction members, which transfer the resulting force to the frame device, in particular via the gear wheels.

In an advantageous embodiment of the invention, the conveying device comprises at least one first conveyor unit, which comprises a first conveying element and a second conveying element, which are attached adjacent to one another in the conveying direction to the traction members. Preferably, the conveying device comprises at least one second conveyor unit, which also comprises a first conveying element and a second conveying element, which are attached adjacent to one another in the conveying direction to the traction members. The distance between the first conveying element and the first conveyor unit and the second conveying element of the first conveyor unit is preferably the same as the distance between the first conveying element of the second conveyor unit and the second conveying element of the second conveyor unit. In particular, the first conveyor unit and the second conveyor unit have the same overall design. The distance is preferably at least substantially 120 cm. In this case, the distance is to be understood as being present while both conveying elements of the respective conveyor unit are arranged on the conveying runs of the traction members. By the adjacent attachment of the conveying elements to the traction members, it is meant that no further conveying element is arranged between the first and the second conveying element of the respective conveyor unit. Due to the identical design of the conveyor units, a plurality of round bales can be conveyed with the same high level of reliability.

Preferably, the second conveying element of the first conveyor unit is attached adjacent in the conveying direction to the first conveying element of the second conveyor unit. No further conveying element is, therefore, arranged between the first conveyor unit and the second conveyor unit. The distance between the first conveying element of the first conveyor unit and the second conveying element of the first conveyor unit preferably differs from a distance between the second conveying element of the first conveyor unit and the first conveying element of the second conveyor unit and is particularly preferably greater than the latter distance. This allows, on the one hand, the round bale to sink so deeply between the conveying elements of the conveyor units that a relative movement between the round bale and the conveying device is avoided particularly reliably and, on the other hand, an unnecessarily large distance between the round bales received by the conveyor units can be avoided in order to be able to receive the largest possible number of round bales using the collecting apparatus.

Preferably, the conveying device has at least one further or third conveyor unit, which comprises a first conveying element and a second conveying element, which are attached adjacent to one another in the conveying direction to the traction members, wherein the distance between the first conveying element of the first conveyor unit and the second conveying element of the first conveyor unit is greater than the distance between the first conveying element of the further or third conveyor unit and the second conveying element of the further or third conveyor unit. The latter distance is particularly preferably at least substantially 90 cm. According to this design, the conveying device has conveyor units, which have different sizes, and which are adapted for round bales of different diameters. The further or third conveyor unit is optimized for round bales which have a smaller diameter due to the smaller distance between its conveying elements.

In an advantageous embodiment of the invention, the conveying device has a plurality of conveyor units designed like the first conveyor unit and a plurality of conveyor units designed like the further or third conveyor unit. In this case, the conveying device is preferably to be brought into a first configuration in which all the conveying elements of the conveyor units designed like the first conveyor unit, including the first conveyor unit, are arranged on one side of the deflection axis plane and all the conveying elements of the conveyor units designed like the third conveyor unit, including the third conveyor unit, are arranged on the other side of the deflection axis plane. This means that the collecting apparatus can be filled with both smaller diameter round bales and larger diameter round bales, wherein each round bale is carried by a conveyor unit corresponding to its size.

Preferably, the at least one conveyor unit, in particular, each conveyor unit, has at least one flexible receiving element. The receiving element is attached to the conveying section of the first conveying element of the respective conveyor unit and to the conveying section of the second conveying element of the respective conveyor unit. The receiving element is, in particular a flat belt, preferably made of a synthetic material. The receiving space is preferably defined locally by a center part of the receiving element arranged centrally between the conveying elements. This design of the at least one conveyor unit increases the flexibility of the collecting apparatus with regard to the diameter of the round bales to be received, since even particularly small round bales can now not fall between the conveying elements of the conveyor unit. In addition, a larger contact surface can be achieved between the round bale and the conveyor unit, which reduces the external load on the round bale.

The conveying device having the at least one conveyor unit, which has the at least one receiving element, is also to be regarded as disclosed in a unique position. In this case, the conveying device is suitable for rotation about two axes and is disclosed irrespective of whether the conveying sections are spaced apart from a frame device by the conveying distance when the conveying device is used. Considerable advantages are achieved compared to previously known conveying devices without receiving elements.

Preferably, the length of a center section of the receiving element arranged between the first conveying element and the second conveying element is greater than the distance between the first conveying element and the second conveying element such that the center section sags at least in the conveying configuration. The center section can make up a part of the receiving element or the entire receiving element. In particular, the center section is arranged between the conveying elements in a plan view from a direction at right angles to the deflection axis plane. The receiving element, in particular its center part, preferably has a smaller distance from the deflection axis plane than at least the conveying sections of the conveying elements. The sagging of the center section reliably counteracts unintentional relative movement between the round bale and the conveyor unit, even in the case of a particularly small diameter of the round bale.

The first conveying element and/or the second conveying element of the at least one conveyor unit preferably have/has at least one continuous cut-out through which the receiving element extends for its attachment. In particular, an end section of the receiving element is arranged within the cut-out. The cut-out is preferably an elongated slot transverse to the conveying direction. An end section of the receiving element opposite the aforementioned center section of the receiving element in relation to the cut-out is preferably prevented from unintentionally passing through the cut-out by an increase in cross-section. This ensures reliable fixing of the receiving element so that even particularly heavy round bales can be conveyed reliably.

Alternatively, or in addition to the cut-out described above and the through-extension of the receiving element, the receiving element has at least one end section which adjoins the center section, and which is completely or partially folded around the first conveying element or the second conveying element. This further increases the load-bearing capacity of the conveyor unit. In this case, in particular, the end section described above does not exist. Preferably, the folded-over end section is attached to the center section, particularly preferably by attachment aids, preferably clamped to the center section. The conveying element is preferably rotatable relative to the receiving element and/or relative to the traction members. In particular, the receiving element is attached to the first conveying element and to the second conveying element in the same way.

Preferably, the at least one conveyor unit, in particular each conveyor unit, has two receiving elements spaced apart from one another transversely to the conveying direction. The receiving elements preferably have a width of at least substantially 27.5 cm. The longitudinal center plane, particularly preferably, does not intersect any receiving element. In addition to the advantages described above, the two lateral receiving elements and the space between them also prevent unintentional larger deposits of loose crop on the conveyor unit.

Preferably, the collecting apparatus has a sensor device having at least one sensor. The sensor device is designed to determine at least one receiving configuration of the conveying device, in which the first conveying element of the at least one conveyor unit or one of the conveyor units is arranged in a conveying element receiving position relative to the frame device. With the first conveying element in the conveying element receiving position, the conveyor unit is optimally positioned to receive a round bale. Positioning can be achieved reliably and, in particular, automatically using the sensor device.

Preferably, the sensor device is designed to determine at least one first receiving configuration and at least one second receiving configuration. In the first receiving configuration, the first conveying element of the first conveyor unit is arranged in the conveying element receiving position. In the second receiving configuration, the first conveying element of the further or third conveyor unit is arranged in the conveying element receiving position. This means that the sensor device can also be used to position the appropriate conveyor unit to receive the round bale, depending on the diameter of the round bale to be received. Positioning is preferably carried out automatically as a function of a signal from the round baler. Depending on this signal or other signals from the round baler, a lowering of the drawbar or a movement of the transfer device is also triggered in particular. In order to differentiate between the conveyor units of different sizes, the sensor device has, in particular, a plurality of sensors at a plurality of positions along at least one of the traction members in order to be able to determine the distance between the conveying elements.

Preferably, the first conveying element in the conveying element receiving position is closer to the deflection axis plane than the second conveying element of the same conveyor unit. Alternatively, the first conveying element is preferably intersected by the deflection axis plane in the conveying element receiving position. The fact that the first conveying element is arranged lower relative to the second conveying element in the conveying element receiving position makes it easier to receive the round bale in the conveying direction.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

The invention is described below with reference to figures. The figures are merely exemplary and do not limit the general idea of the invention.

Several embodiments in which the present disclosure can be practiced are illustrated and described in detail, wherein like reference characters represent like components throughout the several views. The drawings are presented for exemplary purposes and may not be to scale unless otherwise indicated.

FIG. 2 shows a conveying device of the collecting apparatus according to FIG. 1 in a side view.

FIG. 3 shows a perspective view of the conveying device, as shown in FIG. 2.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Figure 1:
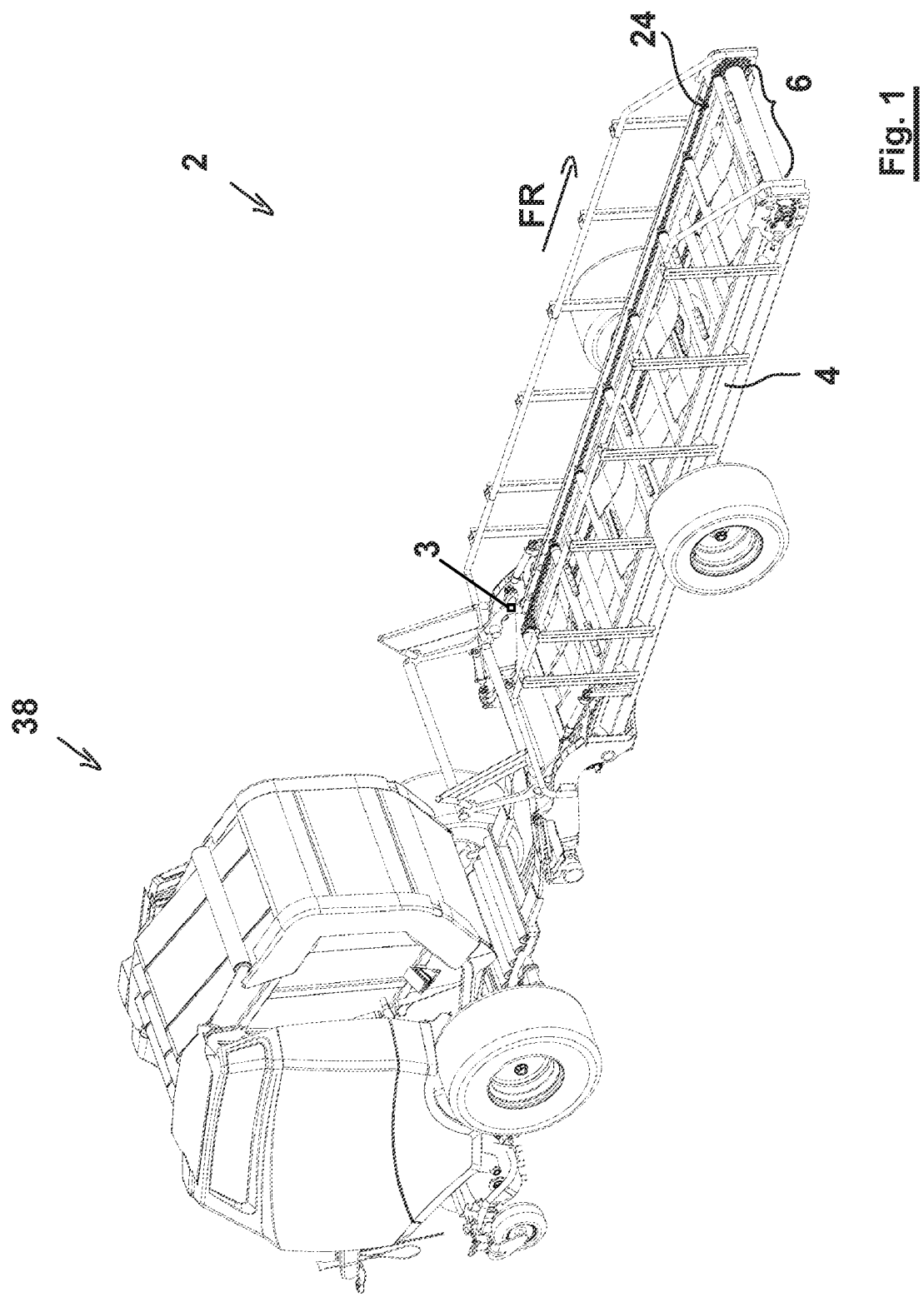
FIG. 1 shows a perspective view of a collecting apparatus according to the invention in a state attached to a round baler.
Figure 4:
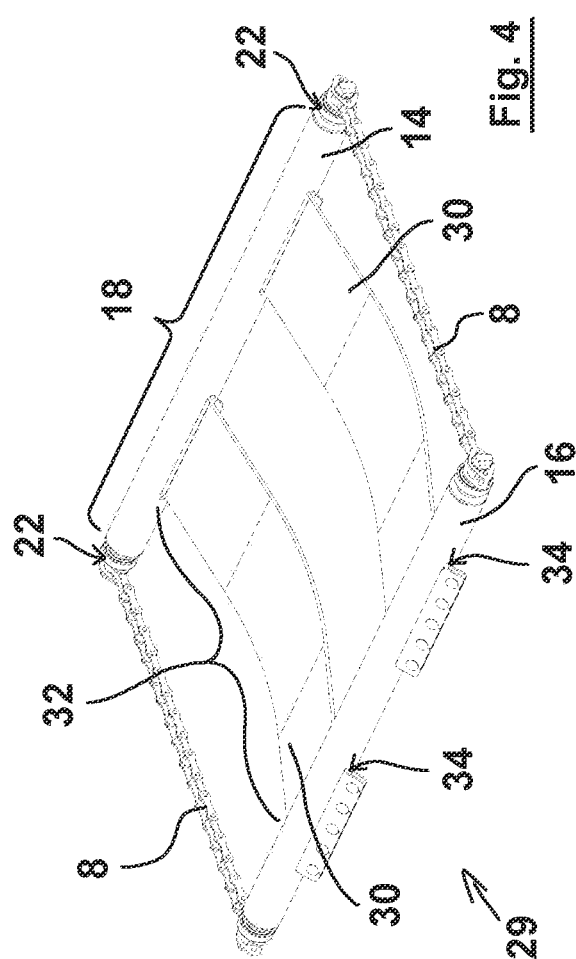
FIG. 4 shows a detailed view of a conveyor unit of the conveying device, as shown in FIG. 3.

FIG. 1 shows a collecting apparatus 2 according to the invention diagonally from behind. The collecting apparatus 2 has a frame device 4 having a running gear and a drawbar, with which the collecting apparatus 2 is attached to a round baler 38 not covered by the invention. In addition, the collecting apparatus 2 comprises a conveying device 6, which is designed to convey a plurality of round bales, not shown, relative to the frame device 4 in a conveying direction FR and is shown in detail in FIGS. 2 to 4.

The conveying device 6 comprises two traction members 8, which in each case are designed as an endless chain and are spaced apart from one another transversely to the conveying direction FR and are designed to rotate about a front deflection axis U1 and a rear deflection axis U2 (see FIG. 3). A hydraulic motor 36 is arranged in the region of the front deflection axis U1 and is used to drive the traction members 8. The traction members 8 comprise an upper conveying run 10 and a lower return run 12 (see FIG. 2). The conveying device 6 comprises a total of 14 conveying elements 14, 16 arranged offset in the conveying direction FR. The conveying elements 14, 16 extend longitudinally transversely to the conveying direction FR between the traction members 8 and are attached thereto. Each conveying element 14, 16 has a conveying section 18, which is arranged centrally between the traction members 8 and has a width less than the distance between the traction members 8 (see FIG. 4).

Figure 5:
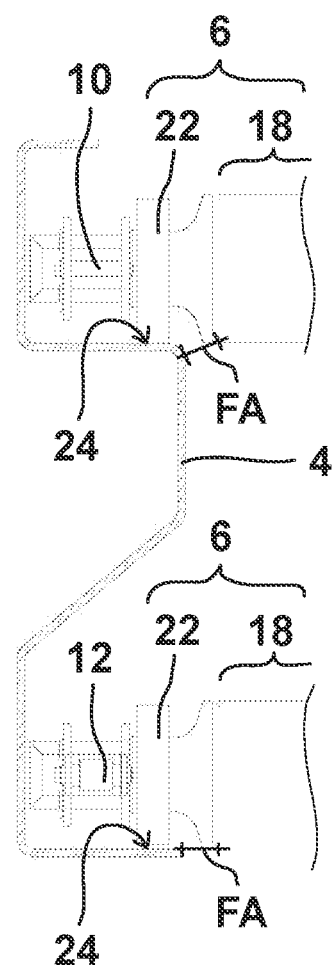
FIG. 5 shows a part of the collecting apparatus according to FIG. 1 in a cross-section.

Each conveying element 14, 16 has two rollers 22, which are rotatably mounted relative to the conveying section 18 and which, at least when the respective conveying element 14, 16 is arranged between the conveying runs 10, rest so as to roll on a rolling surface 24 of the frame device 4 (see. FIGS. 1 and 5, wherein FIG. 5 shows a distance between the rollers 22 and the rolling surface 24 which is not present during operation). The rollers 22 are arranged between the conveying section 18 and one of the traction members 8.

FIG. 1 further shows, by way of example, at least one sensor associated with a sensor device 3, which is set up to determine a conveyor element receiving position of a conveyor element 14 of one of the conveyor units 26, 28, 29. A sensor associated with sensor device 3 can, for example, be designed as a light barrier in order to detect the passage of the conveying element 14.

The conveying elements 14, 16 form seven conveyor units 26, 28, 29 in pairs. Each conveyor unit 26, 28, 29 has a first conveying element 14 and a second conveying element 16, which are attached adjacent to one another in the conveying direction FR to the traction members 8. The conveyor units 26, 28, 29 are of different sizes. The conveying device 6 comprises three conveyor units of a first size, which include a first conveyor unit 26 and a second conveyor unit 28, and four conveyor units of a second size, which include a third conveyor unit 29. A distance A1 between the first conveying element 14 and the second conveying element 16 of the first conveyor unit 26 is equal to a distance A2 between the first conveying element 14 and the second conveying element 16 of the second conveyor unit 28. The distance A1 is also greater than a distance A3 between the second conveying element 16 of the first conveyor unit 26 and the first conveying element 14 of the second conveyor unit 28. Furthermore, the distance A1 is greater than a distance A4 between the first conveying element 14 and the second conveying element 16 of the third conveyor unit 29 (see FIG. 2).

Each conveyor unit 26, 28, 29 has two receiving elements 30, which are attached to the conveying sections 18 of the first conveying element 14 and the second conveying element 16 of the respective conveyor unit 26, 28, 29. The receiving elements 30 are spaced apart from one another transversely to the conveying direction FR. A length L1 of a center section 32 of the receiving element 30 arranged between the first conveying element 14 and the second conveying element 16 is greater than the distance A1 such that the center section 32 sags. The conveying elements 14, 16 have continuous cut-outs 34 through which the receiving elements 30 extend for their attachment.

The conveying sections 18 of the conveying elements 14, 16 are spaced apart from the frame device 4 by a conveying distance FA in order to form receiving spaces 20 extending between them for receiving a round bale to be conveyed. FIG. 5 illustrates the conveying distance FA, so that the conveying sections 18 do not touch the frame device 4 in the radial direction. The conveying sections 18 are spaced from the frame device 4 in a vertical direction at right angles to the conveying direction FR at least as far as the conveying sections 18 are spaced from a deflection axis plane UE in which the front deflection axis U1 and the rear deflection axis U2 lie (see FIG. 2).

From the foregoing, it can be seen that the present disclosure accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 2 | Collecting apparatus |
| 3 | Sensor Device |
| 4 | Frame device |
| 6 | Conveying device |
| 8 | Traction Members (2) |
| 10 | Upper conveying run |
| 12 | Lower return run |
| 14 | First conveying elements |
| 16 | Second conveying elements |
| 18 | Conveying section |
| 22 | Rollers (2) |
| 24 | Rolling surface |
| 26 | First conveyor unit (in pairs) |
| 28 | Second conveyor unit (in pairs) |
| 29 | Third conveyor unit (in pairs) |
| 30 | Receiving elements (2) |
| 32 | Center section |
| 34 | Continuous cut-outs |
| 36 | Hydraulic motor |
| 38 | Round baler |
| A1 | Distance between the first conveying element 14 and the second conveying element 16 of the first conveyor unit 26 |
| A2 | Distance between the first conveying element 14 and the second conveying element 16 of the second conveyor unit 28. |
| A3 | Distance between the second conveying element 16 of the first conveyor unit 26 and the first conveying element 14 of the second conveyor unit 28. |
| A4 | Distance between the first conveying element 14 and the second conveying element 16 of the third conveyor unit 29 |
| FA | Conveying distance is the distance between the conveying sections 18 of the conveying elements 14, 16 spaced apart from the frame device 4 |
| FR | Conveying direction |

TABLE 1-continued

List of Reference Characters

| | |
|---|---|
| L1 | Length of a center section 32 of the receiving element 30 arranged between the first conveying element 14 and the second conveying element 16 |
| UE | Deflection axis plane |
| U1 | Front deflection axis |
| U2 | Rear deflection axis |

Glossary

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent errors can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A collecting apparatus (2) for round bales comprising of:
a frame device (4) and a conveying device (6) which includes a plurality of round bales relative to the frame device (4) in a conveying direction (FR) and has at least two traction members (8) which are spaced apart from one another transversely to the conveying direction (FR), are designed to rotate about a front deflection axis (U1) and a rear deflection axis (U2) and have a conveying run (10) and a return run (12), and has at least two conveying elements (14, 16) which are arranged offset relative to one another in the conveying direction (FR) and which at least in one conveying configuration of the conveying device (6) extend longitudinally between the conveying runs (10) of the traction members (8) transversely to the conveying direction (FR), are attached to the traction members (8) and wherein the at least two conveying elements (14, 16) each having a conveying section (18) arranged centrally between the traction members (8) and comprising a width of each the at least two conveying elements (14, 16) that is less than the width of the distance between the traction members (8), wherein the conveying sections (18) in the conveying configuration are spaced apart from the frame device (4) by a conveying distance (FA) in order to form a receiving space (20) extending between them for receiving a round bale to be conveyed such that a weight of the round bales rests on the at least two conveying elements, wherein the at least two conveying elements are oriented to receive the round bales with an axis of the round bales is substantially perpendicular to the conveying direction, and wherein the conveying device receives one of the plurality of round bales directly from a baler and wherein said conveying device (6) moves the plurality of round bales in a direction that is opposite to a direction of travel of the collecting apparatus;
wherein the conveying device (6) comprises at least a first conveyor unit (26) and a second conveyor unit (28), which each comprises a first conveying element (14) and a second conveying element (16), which are attached adjacent to one another in the conveying direction (FR) to the traction members (8), wherein a distance (A1) between the first conveying element (14) and the second conveying element (16) of the first conveyor unit (26) is equal to a distance (A2) between the first conveying element (14) and the second conveying element (16) of the second conveyor unit (28).

2. The collecting apparatus (2) for round bales according to claim 1, wherein the frame device (4) includes the conveying sections (18) that remain continuously spaced from the frame device (4) by the conveying distance (FA) during operation during the movement of the conveying elements (14, 16) that comprise them in the conveying direction (FR).

3. The collecting apparatus (2) for round bales according to claim 1, wherein the conveying sections (18) are spaced apart from the frame device (4) in a longitudinal section at least as far as the conveying sections (18) are spaced apart from a deflection axis plane (UE) in which the front deflection axis (U1) and the rear deflection axis (U2) lie.

4. The collecting apparatus (2) for round bales according to claim 1, wherein at least one of the conveying elements (14, 16) has at least one roller (22) which is rotatably mounted relative to the conveying section (18) of the conveying element (14, 16) and which, at least when the conveying element (14, 16) is arranged between the conveying runs (10), rests so as to roll on a rolling surface (24) of the frame device (4).

5. The collecting apparatus (2) for round bales according to claim 4, wherein the roller (22) is arranged between the conveying section (18) of the conveying element (14, 16) and at least one of the traction members (8).

6. The collecting apparatus (2) for round bales according to claim 1, wherein the second conveying element (16) of the first conveyor unit (26) is attached adjacent in the conveying direction (FR) to the first conveying element (14)

of the second conveyor unit (28), wherein the distance (A1) between the first conveying element (14) and the second conveying element (16) of the first conveyor unit (26) differs from, in particular is greater than, a distance (A3) between the second conveying element (16) of the first conveyor unit (26) and the first conveying element (14) of the second conveyor unit (28).

7. The collecting apparatus (2) for round bales according to claim 1, wherein the conveying device (6) comprises at least one third conveyor unit (29), which comprises a first conveying element (14) and a second conveying element (16), which are attached adjacent to one another in the conveying direction (FR) to the traction members (8) wherein the distance (A1) between the first conveying element (14) and the second conveying element (16) of the first conveyor unit (26) is greater than a distance (A4) between the first conveying element (14) and the second conveying element (16) of the third conveyor unit (29).

8. The collecting apparatus (2) for round bales according to claim 1, wherein each conveyor unit (26, 28) has at least one flexible receiving element (30), which is attached to the conveying section (18) of the first conveying element (14) and to the conveying section (18) of the second conveying element (16) of the respective conveyor unit (26, 28).

9. The collecting apparatus (2) for round bales according to claim 8, wherein a length (L1) of a center section (32) of the flexible receiving element (30) arranged between the first conveying element (14) and the second conveying element (16) is greater than the distance (A1) between the first conveying element (14) and the second conveying element (16) in such a way that the center section (32) sags in the conveying configuration.

10. The collecting apparatus (2) for round bales according to claim 8, wherein the first conveying element (14) and/or the second conveying element (16) have a continuous cut-out (34) through which the flexible receiving element (30) extends for its attachment.

11. The collecting apparatus (2) for round bales according to claim 8, wherein the flexible receiving element (30) has at least one end section which adjoins the center section (32), is folded around the first conveying element (14) or the second conveying element (16) and is attached to the center section (32).

12. The collecting apparatus (2) for round bales according to claim 1, wherein the conveyor units (26, 28) in each case have two receiving elements (30) spaced apart from one another transversely to the conveying direction (FR).

13. The collecting apparatus (2) for round bales according to claim 1, further comprising a sensor device (3) which has at least one sensor and is designed to determine at least one receiving configuration of the conveying device (6), in which the first conveying element (14) of one of the conveyor units (26, 28, 29) is arranged in a conveying element receiving position relative to the frame device (4).

14. The collecting apparatus (2) for round bales according to claim 13, wherein the sensor device (3) is designed to determine at least a first receiving configuration, in which the first conveying element (14) of the first conveyor unit (26) is arranged in the conveying element receiving position, and at least a second receiving configuration, in which the first conveying element (14) of the third conveyor unit (29) is arranged in the conveying element receiving position.

15. The collecting apparatus (2) for round bales according to claim 3, wherein the first conveying element (14) arranged in the conveying element receiving position is intersected by the deflection axis plane (UE) or is closer to the deflection axis plane (UE) than the second conveying element (16) of the same conveyor unit (26, 28, 29).

* * * * *